(12) United States Patent
Moerke

(10) Patent No.: US 6,514,023 B2
(45) Date of Patent: Feb. 4, 2003

(54) REMOVABLE AND REUSABLE FASTENER

(75) Inventor: Benjamin H. Moerke, Eau Claire, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/865,169

(22) Filed: May 24, 2001

(65) Prior Publication Data

US 2002/0176762 A1 Nov. 28, 2002

(51) Int. Cl.$^7$ ................................................ F16B 13/06
(52) U.S. Cl. ............................................ 411/45; 411/41
(58) Field of Search ............................ 411/41, 45, 46, 411/47, 48, 49, 50, 508, 509, 510, 913, 182

(56) References Cited

U.S. PATENT DOCUMENTS

| | | | |
|---|---|---|---|
| 2,252,286 A | | 8/1941 | Hathorn |
| 3,466,966 A | | 9/1969 | Brown |
| 4,405,272 A | * | 9/1983 | Wollar .......................... 411/41 |
| 4,610,587 A | | 9/1986 | Wollar et al. |
| 4,636,122 A | | 1/1987 | Rooney |
| 4,762,437 A | | 8/1988 | Mitomi |
| 4,810,147 A | * | 3/1989 | Hirohata ................. 174/138 D |
| 4,900,210 A | | 2/1990 | Buchanan et al. |
| 4,927,287 A | * | 5/1990 | Ohkawa et al. ............... 24/297 |
| 5,211,519 A | * | 5/1993 | Saito ........................... 411/45 |
| 5,246,322 A | | 9/1993 | Salice |
| 5,370,484 A | * | 12/1994 | Morikawa et al. ............ 411/41 |
| 5,540,528 A | | 7/1996 | Schmidt et al. |
| 5,669,108 A | | 9/1997 | Ferrari et al. |
| 5,846,040 A | * | 12/1998 | Ueno ......................... 411/369 |
| 6,045,309 A | | 4/2000 | LeVey |
| 6,082,788 A | | 7/2000 | Turner |
| 6,089,805 A | * | 7/2000 | Salmon ....................... 411/40 |

FOREIGN PATENT DOCUMENTS

EP 0012791 B1 * 6/1983 ........... F16B/33/02

\* cited by examiner

*Primary Examiner*—Lynne H. Browne
*Assistant Examiner*—Jori Schiffman
(74) *Attorney, Agent, or Firm*—Pitney, Hardin, Kipp, Szuch LLP

(57) ABSTRACT

The fastener includes a pin and a body. The pin includes longitudinal grooves which communicate with partially threaded grooved which traverse the circumference of the shank by an interger multiple of 180°. Retention fingers engage the longitudinal grooves in the pre-installed configuration and allow straight-line insertion of the pin into the body. The retention fingers are then urged outwardly by the walls of the partially threaded grooves and then snap engage into subsequent portions of the partially threaded grooves thereby preventing straight-line removal of the pin. The pin, however, can be subsequently removed by threaded rotating the pin until the retention fingers engage the longitudinal grooves. Thereafter, the pin can be manually removed by a straight-line motion.

10 Claims, 3 Drawing Sheets

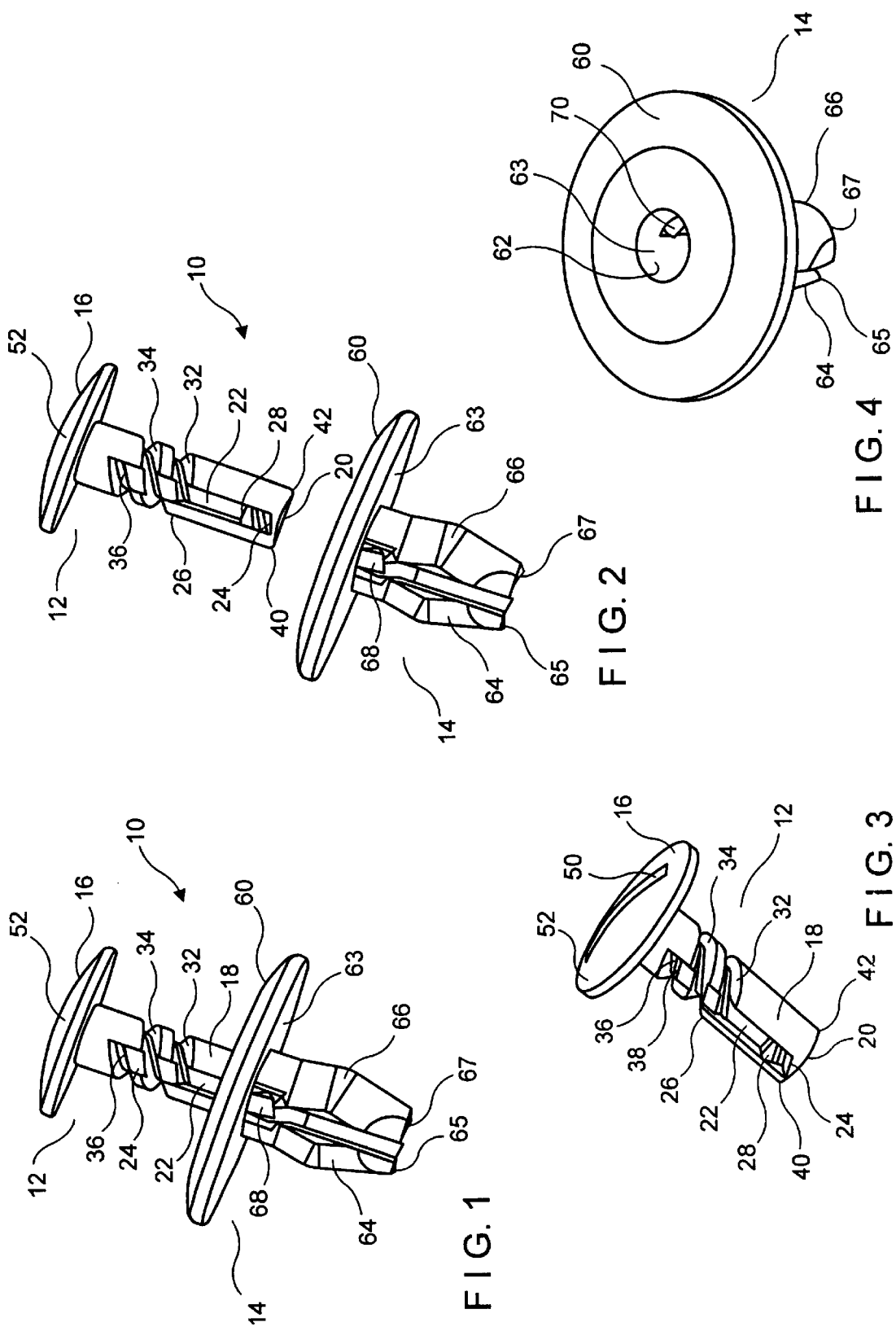

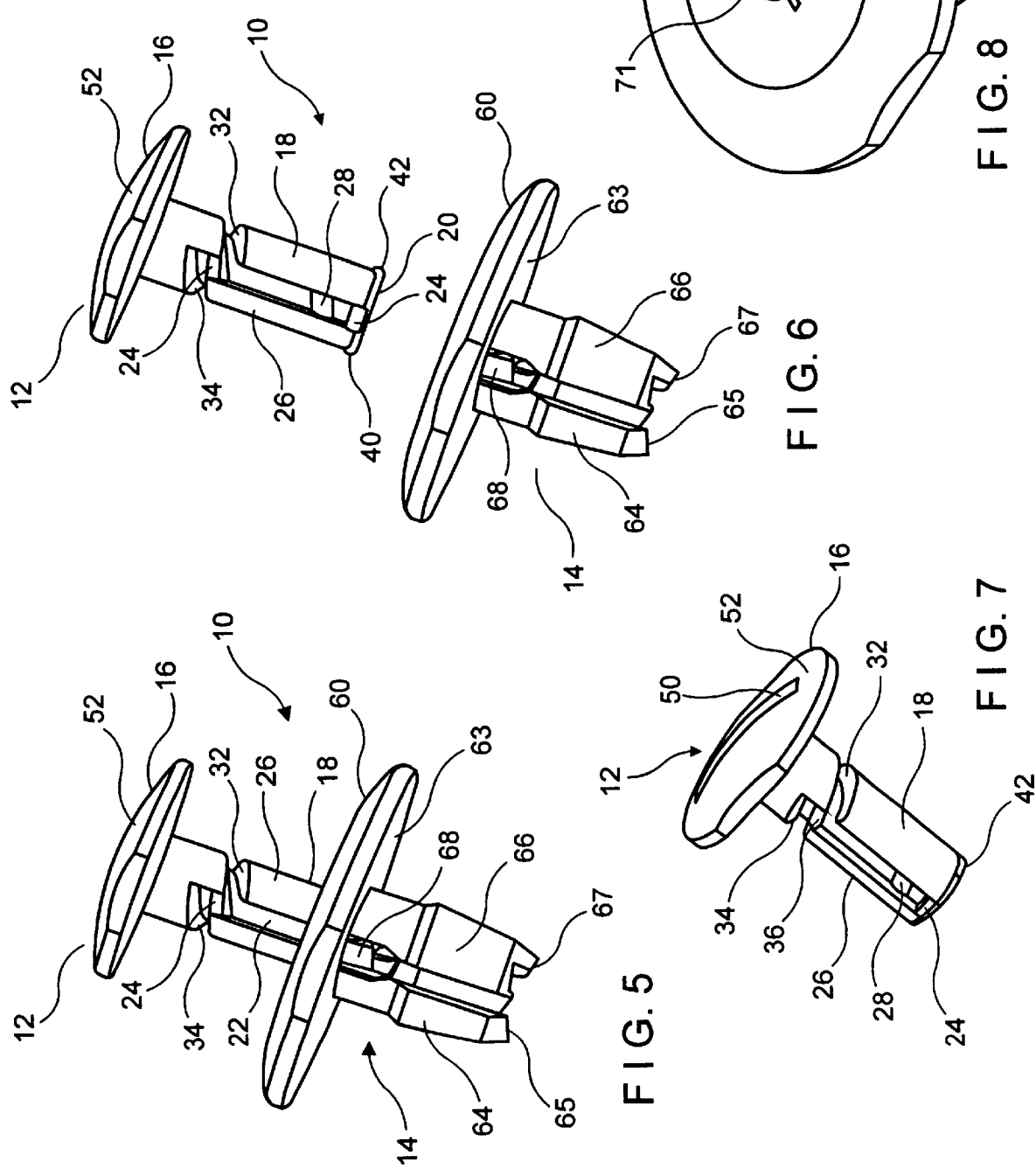

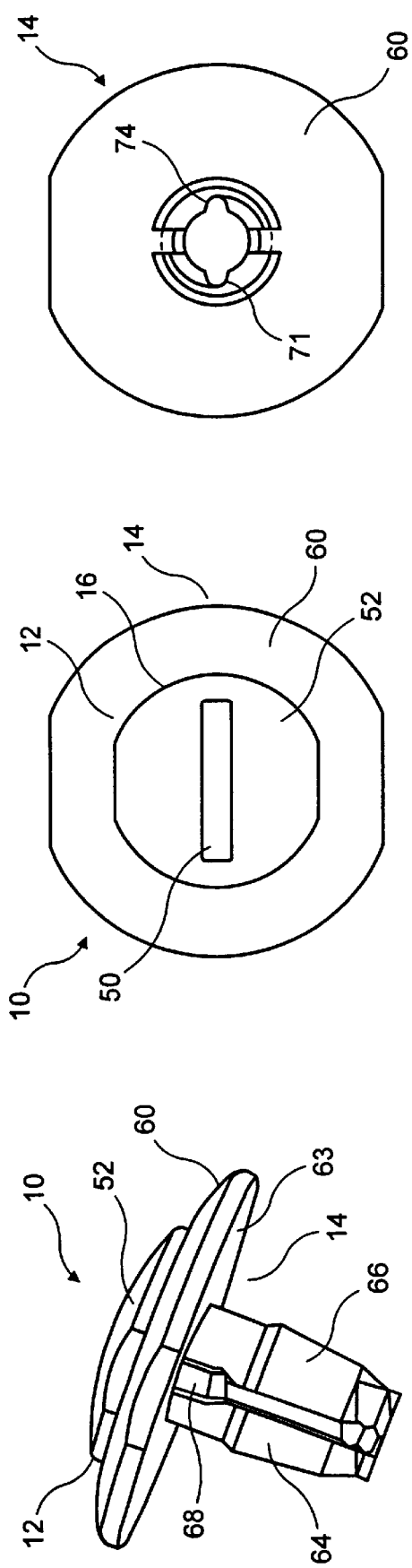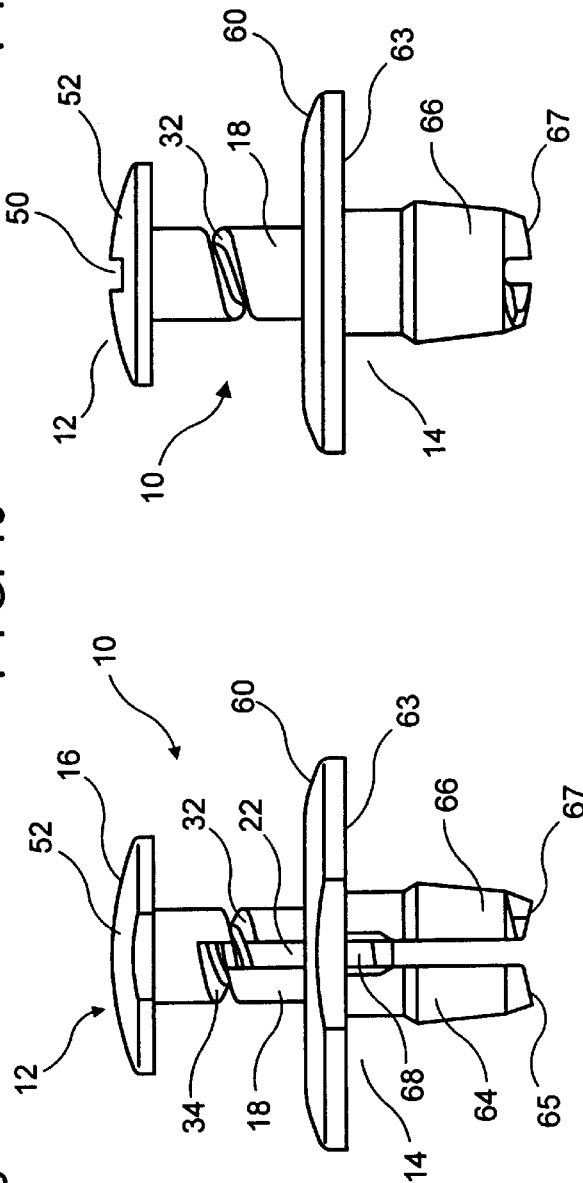

REMOVABLE AND REUSABLE FASTENER

BACKGROUND OF THE INVENTION

1. Field of the Invention

This invention pertains to a two-piece rivet-type fastener, such as a plastic rivet, which includes a pin portion and a head portion, and which can be removed and reused with little or no damage to the fastener. The fastener can be reinstalled with the same push-in movement originally used to install the fastener.

2. Description of the Prior Art

Two-piece rivet-type fasteners are known in the prior art. However, typically such fasteners are applied or fastened in such a way that it is difficult to remove these fasteners without damaging the fasteners. This damage typically prevents the re-installation and reuse of the fasteners, particularly if the original full strength and durability of the fastener is required to be maintained after the re-installation.

More specifically, some prior art which incorporates threads and fingers is difficult to service because the pressure on the pin head while turning may cause the mating portion on the body to skip into the next thread so that the pin cannot be successfully unscrewed. Similarly, some prior art incorporated threads but provided no method of alignment between the threads and the mating features on the body. This often prevented the pin head from sitting flush on the body.

Additionally, two-piece rivet fasteners should be simple and intuitive to use, without the need for prolonged turning, special tools or instruction.

Examples of prior art include U.S. Pat. No. 6,082,788 entitled "Push-to-Close Latch" issued on Jul. 4, 2000 to Turner et al.; U.S. Pat. No. 6,045,309 entitled "Two-Piece Rivet with Pre-Driven Configuration" issued on Apr. 4, 2000 to LeVey and commonly assigned with the present application; U.S. Pat. No. 5,669,108 entitled "Fastening Unit of Quick Fastening of Iron Fittings, and Iron Fittings with Such Fastening Unit" issued on Sep. 23, 1997 to Ferrari et al.; U.S. Pat. No. 5,540,528 entitled "Rivet Made of Plastic Material for Securing a Plate-Like Workpiece to a Support Assembly with an Approximately Plane Surface" issued on Jul. 30, 1996 to Schmidt et al.; U.S. Pat. No. 5,246,322 entitled "Fastening Element Comprising a Dowel-Shaped Sleeve" issued on Sep. 21, 1993 to Salice; U.S. Pat. No. 4,900,210 entitled "Push In-Screw Out Fastening System" issued on Feb. 13, 1990 to Buchanan et al.; and U.S. Pat. No. 4,762,437 entitled "Fastener" issued on Aug. 9, 1988 to Mitomi.

OBJECTS AND SUMMARY OF THE INVENTION

It is therefore an object of the present invention to provide a two-piece rivet-like fastener which can be removed without damaging the fastener.

It is therefore a further object of the present invention to provide a two-piece rivet-like fastener which can be easily removed, serviced, re-installed and reused, while maintaining substantially the same strength of the original installation.

It is therefore a still further object of the present invention to provide a two-piece rivet-like fastener which is simple and intuitive to use, without the need for excessive turning, special tools or training.

It is therefore a final object of the present invention to provide a two-piece rivet-like fastener which achieves the above goals without a significant increase in manufacturing costs.

These and other objects are attained by providing a two-piece rivet-like fastener which includes a pin portion and a body portion. The pin portion includes a head portion and a shank portion. The fastener can be installed by pushing the pin portion into the body portion. The pin expands or fills the gap in the body thereby providing retention. When the pin is pushed home, the retention fingers of the body snap into the partial threads on both sides of the pin. The assembly guide bumps and slots insure that the alignment is correct. The pin is kept from rotating by both the pressure of the legs on the pin, and by slight interferences between the anti-rotation bumps on the pin and the retention fingers on the body. The fastener can be subsequently removed by threadedly rotating the pin until the retention fingers of the body reach the longitudinal guide slots of the pin. The interaction between the body retention fingers and the pin threads lift the pin up so that it can be easily grabbed and pulled up. The relief cutouts in the body create the necessary space for the assembly guide bumps during this movement. The assembly retention ledges then capture the retention fingers and the pin and body can be removed by pulling on the pin. At this point, the pin is in the same position that it was prior to the initial installation, only rotated some integer multiple of 180 degrees. The fastener can then be reinstalled identically to the initial installation.

Alternatively, if an open nose is utilized, the pin and body can be molded as a single piece, with a flash connection between them. The assembly guides are typically not required in this embodiment as the parts are molded in the proper alignment. Pre-driving can be performed by breaking the flash connection.

DESCRIPTION OF THE DRAWINGS

Further objects and advantages of the invention will become apparent from the following description and claims, and from the accompanying drawings, wherein:

FIG. 1 is a perspective view of the "as shipped" or pre-driven configuration of a first aspect of the fastener of the present invention.

FIG. 2 is an exploded perspective view of the first aspect of the fastener of the present invention.

FIG. 3 is a perspective view of the pin portion of the first aspect of the fastener of the present invention.

FIG. 4 is a perspective view of the body portion of the first aspect of the fastener of the present invention.

FIG. 5 is a perspective view of the "as shipped" or pre-driven configuration of a second aspect of the fastener of the present invention.

FIG. 6 is an exploded perspective view of the second aspect of the fastener of the present invention.

FIG. 7 is a perspective view of the pin portion of the second aspect of the fastener of the present invention.

FIG. 8 is a perspective view of the body portion of the second aspect of the fastener of the present invention.

FIG. 9 is a perspective view of the installed configuration of the second aspect of the fastener of the present invention.

FIG. 10 is a top plan view of the second aspect of the fastener of the present invention.

FIG. 11 is a side plan view of the pre-driven configuration of the second aspect of the fastener of the present invention.

FIG. 12 is a front plan view of the pre-driven configuration of the second aspect of the fastener of the present invention.

FIG. 13 is a top plan view of the head portion of the second aspect of the fastener of the present invention.

DETAILED DESCRIPTION OF THE PREFERRED EMBODIMENTS

Referring now to the drawings in detail wherein like numerals refer to like elements throughout the several views, one sees that FIG. 1 is a perspective view of the first aspect of fastener 10, shown in the pre-installed configuration. Fastener 10 includes pin 12 and body 14. Pin 12 and body 14 are typically molded from nylon 6/6, although those skilled in the art will recognize a range of equivalent substitutions.

Pin 12 includes disk-shaped head 16 and generally cylindrically-shaped shank 18 extending therefrom terminating in distal end 20. Shank 18 includes diametrically opposed longitudinal grooves 22 (only one groove is illustrated as the second groove is hidden from view on the opposite side of shank 18 on the illustrations) starting inwardly adjacent from assembly retention ledge 24 formed on distal end 20 and extending to the removal guide slots 32, 34 of shank 18. Pre-drive locator bumps 28 are formed in diametrically opposed longitudinal grooves 20 inwardly from assembly retention ledges 24. Partially threaded removal guide slots 32, 34 extend from longitudinal grooves 22 of shank 18 and traverse 360° about shank 18 and terminate above assembly retention ledges 24.

As shown on FIG. 2, anti-rotation bumps 38 are formed in the threads so that they engage retention fingers 68. Pre-assembly guide locator bumps 40, 42 are formed on distal end 20 of shank 18 at positions 90° away from longitudinal grooves 22.

Disk-shaped head 16 further includes removal recess 50 (e.g., Phillips-head or similar) on exterior surface 52 thereof.

Body 14 includes disk-shaped surface 60 through which central opening 62 leads to channel 63. Retention legs 64, 66 are formed on both sides of channel 63. Retention fingers 68, 70 are formed between retention legs 64, 66 adjacent to underside 63 of disk-shaped surface 60.

Second aspect of fastener 10 is illustrated in FIGS. 5–13 and includes elements and structure generally corresponding to those in FIGS. 1–4 with some exceptions. The most notable exception is that partially threaded installation and removal guide slots 32, 34 traverse 180° rather than 360° about the circumference of shank 18 and above assembly retention ledges 24. As will be explained in more detail hereinafter, this results in second aspect of fastener 10 requiring that pin 12 be turned only 180° rather than 360° in order to release the pin 12. It is envisioned that partially threaded removal guide slots 32, 34 would traverse the circumference of shank 18 by an integer multiple of 180°. Additionally, as shown in FIG. 8, the second aspect of fastener 10 can include assembly guide slots 71, 74 formed longitudinally within the interior of channel 63.

To install fastener 10, the user pushes pin 12 into body 14 in a straight-line motion. Shank 18 of pin 12 forces retention legs 64, 66 apart thereby reaching the installed position as illustrated in FIG. 9. As the pin 12 approaches the installed position as illustrated in FIG. 9, retention fingers 68, 70 are urged outwardly and snap into partially threaded removal guide slots 32, 34. Moreover, assembly guide bumps 40, 42 and assembly guide slots 71, 74 assure that the alignment between pin 12 and body 14 is correct. Pin 12 is prevented from rotating by both the pressure of retention legs 64, 66 on shank 18 of pin 12, and by the slight interferences between the anti-rotation bumps 38 and the retention fingers 68, 70 on body 14.

In order to subsequently remove or uninstall fastener 10, pin 12 is rotated until the retention fingers 68, 70 reach diametrically opposed longitudinal grooves 22. This would require 360° rotation with the first aspect of fastener 10 illustrated in FIGS. 1–4 and 180° rotation with the second aspect of fastener 10 illustrated in FIGS. 5–12. The interaction between the retention fingers 68, 70 and the partially threaded removal guide slots 32, 34 lifts pin 12 up so that it can be easily removed manually. For some applications, the first aspect of fastener 10 may be particularly advantageous in that pin 12 is raised higher during this process and may be easier to grip manually by the user.

After the pin 12 is removed, neither pin 12 nor body 14 has been substantially deformed, so that pin 12 can be subsequently installed identically to the original installation.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A fastener including:

a pin including a head and a shank;

a body including a surface with an aperture therethrough, said aperture leading to a channel, said channel being at least partially bounded by retention legs;

said shank terminating in a distal end, and including at least one longitudinal groove having an axial length extending from said distal end along a portion of said shank, said at least one longitudinal groove being in communication with at least one threaded groove extending about at least a portion of a circumference of said shank; the threaded groove extending around only a portion of the axial length of the longitudinal groove and said body including at least one retention finger which engages said at least one longitudinal groove as said pin is inserted into said body, is urged outwardly by a wall of said at least one threaded groove thereby riding over said wall and snap engages into a subsequent portion of said at least one threaded groove.

2. The fastener of claim 1 wherein said pin is pushed into said body in a straight line motion to an installed position wherein said at least one retention finger engages said subsequent portion of at least one threaded groove thereby preventing straight line removal of said pin from said body and thereby allowing said pin to threadedly rotate to move from said installed position.

3. The fastener of claim 2 wherein said retention legs are forced apart by said shank of said pin in said installed position.

4. The fastener of claim 3 wherein said at least one threaded groove extends about a circumference of said shank by an integer multiple of 180°.

5. The fastener of claim 4 wherein at least one retention finger is formed between said retention legs on an underside of said surface.

6. The fastener of claim 5 wherein said shank of said pin and said aperture of body include complementary alignment elements.

7. The fastener of claim 6 wherein said at least one longitudinal groove includes two diametrically opposed longitudinal grooves.

8. The fastener of claim 7 wherein said at least one threaded groove extends about a circumference of said shank by 360°.

9. The fastener of claim 8 wherein said head of said pin includes a removal recess.

10. The fastener of claim 9 wherein said pin and said body are formed of molded plastic.

* * * * *